July 2, 1946. G. E. DATH 2,402,987
CAR CONSTRUCTION.
Filed May 5, 1945
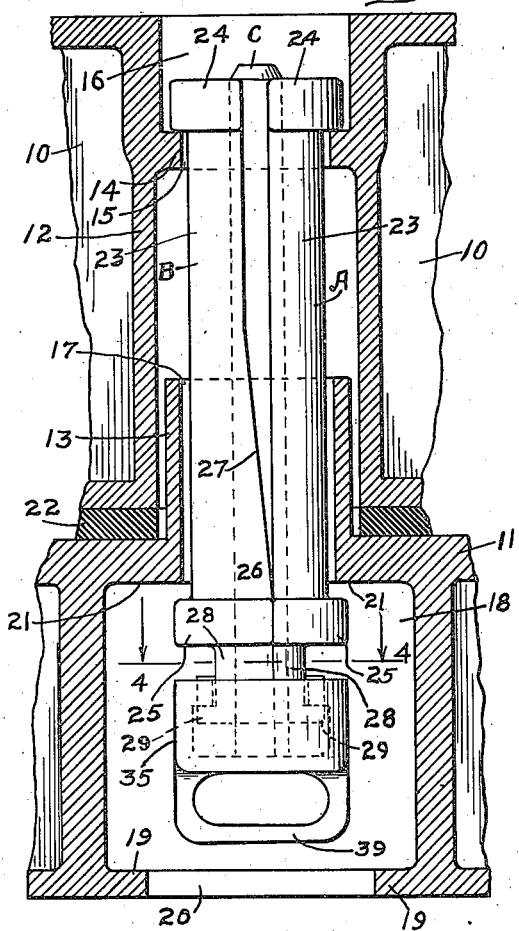
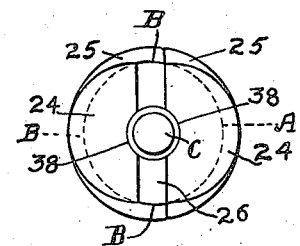
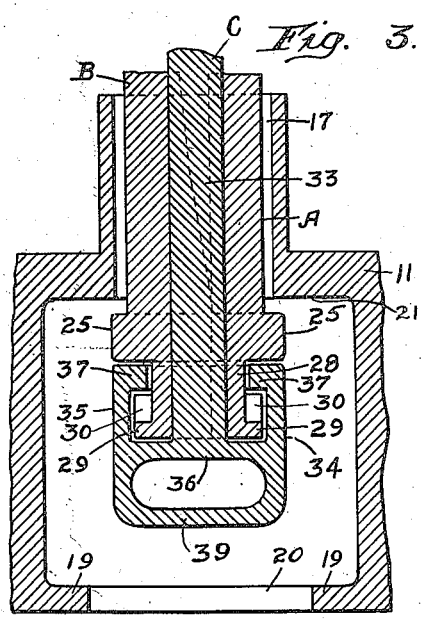
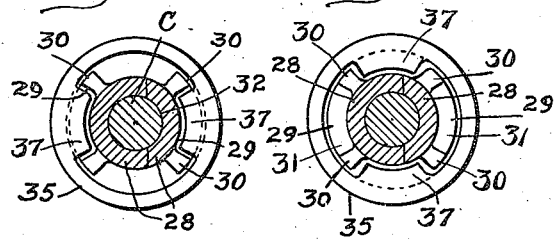
Inventor:
George E. Dath.
By Henry Fuchs.
Atty.

Patented July 2, 1946

2,402,987

UNITED STATES PATENT OFFICE 2,402,987

CAR CONSTRUCTION

George E. Dath, Mokena, Ill., assignor to W. H. Miner, Inc., Chicago, Ill., a corporation of Delaware Application May 5, 1945, Serial No. 592,142

6 Claims. (Cl. 105—200)

This invention relates to improvements in car construction.

One object of the invention is to provide an improved car construction comprising a locking center pin for connecting the body and truck bolsters of a railway car, wherein the pin is composed of sections which may be expanded to interlock with the bolsters and is designed to be locked in position by a central filler element which acts as spreading means, and wherein means is provided for preventing the filler element from becoming accidentally detached from the other parts of the center pin.

A more specific object of the invention is to provide a locking center pin comprising a pair of outer sections or members and a central filler element for holding the outer sections expanded, wherein the filler element is provided with a hollow locking head at its lower end and is rotatable to bring the locking head into shouldered locking engagement with ledges or shelves at the lower ends of the outer sections, and wherein the hollow locking head, in the assembled condition of the center pin, surrounds and houses the locking ledges or shelves and has interior locking means engaging the ledges or shelves, thereby protecting the interlocking parts of the filler element and outer sections against damage.

Other objects of the invention will more clearly appear from the description and claims hereinafter following.

In the drawing forming a part of this specification, Figure 1 is a vertical, longitudinal sectional view through the mid-portions of the body and truck bolsters of a railway car, illustrating my improvements in connection therewith, the center pin being shown in elevation. Figure 2 is a top plan view of the center pin shown in Figure 1. Figure 3 is a view similar to Figure 1, the body bolster being omitted, and the upper portion of the center pin being broken away, the center pin being shown in transverse, vertical section. Figure 4 is a horizontal sectional view through the lower end portion of the center pin, corresponding substantially to the line 4—4 of Figure 1. Figure 5 is a view similar to Figure 4 showing the parts in somewhat different position and illustrating one of the steps involved in assembling the parts of the center pin.

In said drawing, 10 indicates the body bolster of the car and 11, the truck bolster. These bolsters are of usual well-known design, the body bolster being provided with a center section 12 to accommodate the center pin, and the truck bolster being provided with an upstanding hollow boss or flange 13, projecting into the section 12 of the body bolster. The section 12 is of substantially tubular form having an inwardly projecting flange or rib 14 between the top and bottom ends thereof. The flange 14 defines an opening 15 adapted to accommodate the center pin. Above the flange 14, the section 12 forms a pocket 16 adapted to accommodate the head at the upper end of the pin. The hollow boss 13 provides a circular opening 17 to accommodate the center pin. The opening 17 of the truck bolster and the opening 15 of the body bolster are in axial alignment. Below the opening 17, the truck bolster is provided with a pocket 18 having a bottom wall 19. The bottom wall 19 has an opening 20 therethrough axially aligned with the openings 15 and 17, but of greater diameter than these openings. The pocket 18 serves the purpose of accommodating the head at the bottom end of the center pin. As shown in Figure 1, the pocket 18 is of greater size than the opening 17 of the boss 13, thereby providing a downwardly facing shoulder 21 adjacent said opening, which cooperates with a head at the bottom end of the center pin to restrict upward movement of the latter. The usual bearing plate or shim 22 is interposed between the body and truck bolsters around the upwardly projecting boss 13 of the truck bolster.

My improved locking center pin comprises broadly a pair of outer members or sections A and B and a central spreader or filler element C.

The two outer members or sections A and B are of similar design, except as hereinafter pointed out. Each outer member comprises a substantially semi-cylindrical shank 23 having heads 24 and 25 at the top and bottom ends thereof. The top head 24 is in the form of an eccentric, substantially semi-cylindrical, outstanding flange, and the bottom head 25 is in the form of a concentric, substantially semi-cylindrical flange. The members A and B are laterally spaced apart at the upper ends and have contact with each other on their inner sides at their lower ends. The member B is laterally inwardly enlarged at its lower end, as indicated at 26, to provide this contact. The zone of contact is on substantially flat, vertical faces, preferably of a vertical height at least as great as the thickness of the flange or head 25 of either of these members. Immediately above the zone of contact, the enlarged portion 26 of the member B inclines away from the member A in upward direction, as indicated at 27. The spaced arrangement of the upper end portions of the members A and B permits collapse of said upper end portions of the pin to make possible insertion and removal of said members.

The heads 24—24 at the upper end of the members A and B are made of such a size and contour that they will pass freely through the pin receiving openings 15 and 17 of the body and truck bolsters when these members are inserted or removed in succession from underneath the truck bolster, with the filler member absent so that the upper portion of the center pin may be collapsed. Each member A and B has a depending extension 28 at its lower end of arc-shaped, transverse cross section provided with a radially outwardly projecting, horizontal wing or flange 29 forming a shelf. The wings or flanges 29—29 of the two members A and B are diametrically opposed and each flange has upstanding vertical walls 30—30 at opposite ends thereof defining a seat 31 therebetween. As shown most clearly in Figures 4 and 5, the arc-shaped, downward extensions 28—28 of the two members A and B are in abutment with each other on their inner side edges and together define a cylindrical portion provided with a central opening 32 adapted to accommodate the cylindrical filler element C. As shown in Figures 1 and 3, the upper ends of the walls 30—30 are spaced an appreciable distance below the underneath sides of the heads 25—25 of the members A and B for a purpose hereinafter pointed out.

The filler element C comprises a cylindrical shank 33 and a head 34 at the lower end of the shank. A depending eye 39 is provided on the head 34 for manipulating the element C. The head 34 is hollow, being of cup-shape, and comprises a cylindrical side wall 35 and a bottom wall 36 from the center of which the shank 33 upstands. The side wall 35 surrounds the shank in spaced relation thereto and is provided with a pair of diametrically opposite, inturned lugs 37—37 at its upper end of a size to fit the seats 31—31 of the members A and B. As shown most clearly in Figures 3, 4, and 5, the opening defined by the wall 35 of the head 34 is of such a size as to freely accommodate the wings 29—29 of the members A and B therewithin, and the lugs 37—37 are of such a thickness that they will pass freely through the space between the underneath sides of the heads 25—25 and the side walls 30—30 of the seats of the wings 29—29 when said member C is turned about its longitudinal axis.

As shown in the drawing, the top end of the shank of the element C is preferably beveled off to facilitate insertion of said element between the outer members A and B.

The inner sides of the members A and B are centrally, vertically slotted or grooved, as indicated at 38. These slots or grooves are of concave, transverse cross section and when the members A and B of the pin are in assembled position form a central bore in which the shank 33 of the element C fits and is loosely rotatable.

As will be evident, upon reference to Figures 1 to 4 inclusive, when the pin comprising the outer members A and B and the filler element C interposed between said members is applied to the bolsters, the shank of the center pin substantially fits the openings 15 and 17 of the body and truck bolsters with the heads 24—24 and 25—25 disposed directly above the shoulder presented by the flange or rib 14 of the body bolster, and below the shoulder 21 of the truck bolster. The pin is thus held against removal in both downward and upward direction and locks the bolsters together.

In applying the center pin to the bolsters, the member A is first inserted through the openings of the bolsters from underneath the truck bolster and displaced laterally outwardly to engage the heads 24 and 25 thereof with the shoulders of the bolsters. After this has been done, the member B is inserted from underneath the truck bolster, through the bolster openings, alongside the member A. As will be evident, the inclined portion 27 of the member B provides the required clearance to permit inclining of this member to the proper extent to permit the head at the upper end to pass through the bolster openings. When the member B has been fully inserted, it will have been displaced laterally outwardly at its upper end by spreading apart the lower end of the pin, to bring the head 24 thereof into shouldered engagement with the bolster 10, and, due to the fact that the members A and B have their inner side faces adjacent the lower ends of the pin contacting, the head 25 at the lower end of the member B will be forced to engage beneath the shoulder of the truck bolster. The filler element C is next inserted between the members A and B from underneath the truck bolster to hold the members of the pin separated and in shouldered engagement with the body bolster. Before application of the element C, it is turned so that the lugs 37—37 of the head 34 are in vertical alignment with the openings between the wings or shelves 29—29, as shown in Figure 5, to pass therebetween as the element C is pushed upwardly. The element C is pushed upwardly until the lugs 37 thereof reach the level shown in Figure 3, where they will pass between the underneath sides of the heads 25—25 and the upper ends of the side walls 30—30 of the seats 31—31 when the element C is turned. The filler element is then given a partial turn to align the lugs 37—37 with the seats 31—31, as shown in Figure 4, and is permitted to drop or is pulled down forcibly to engage the lugs 37—37 in the seats 31—31, as shown in Figures 1 and 4. The element C is thus securely held against rotation with respect to the members A and B, thereby preventing accidental disengagement of the same from between the members A and B.

In removing the center pin, the reverse procedure is followed. The element C is first pushed upwardly to lift the lugs 37—37 out of the seats 31—31, and is given a quarter turn to align the lugs 37—37 with the openings between the wings 29—29 of the members A and B. The element C is then withdrawn from between the members A and B by pulling the same downwardly, a hook or similar tool being used for this purpose, the eye 39 serving as a convenient means for anchoring the hook. After withdrawal of the filler element, the outer members are removed in succession, the member B being first withdrawn.

I claim:

1. In car construction, the combination with body and truck bolsters having aligned center pin receiving openings; of a center pin insertable from beneath said truck bolster, said pin including a pair of outer members headed at opposite ends for shouldered engagement with the bolsters, and a central filler element interposed between said outer members for holding the same spread apart, said filler element being rotatable and having a hollow locking head at its lower end, and said outer members having exterior locking projections at their lower ends surrounded by said head and with which said head is interlocked by rotation of said filler element, to hold the latter against removal in downward direction.

2. In car construction, the combination with body and truck bolsters having aligned center pin receiving openings; of a center pin insertable from beneath said truck bolster, said pin including outer members headed at opposite ends and a central filler element between said outer members, said filler element holding the pin expanded with the heads thereof in shouldered engagement with the bolsters, said outer members having laterally projecting, circumferentially spaced retaining ledges at their lower ends having upwardly opening seats, said filler element having an upwardly opening, cup-shaped locking head on the lower end thereof provided with inwardly projecting, interior retaining lugs, said head housing said retaining ledges and having the lugs thereof supported in said seats to lock the element against rotation and hold the same against downward displacement, said element being upwardly displaceable to disengage the lugs from the seats and rotatable to bring said lugs into alignment with the spaces between said ledges to permit withdrawal of said element.

3. In a locking pin of the character described, the combination with elongated outer members having retaining flanges at the top and bottom ends thereof; of an elongated filler element between said members, said filler element being rotatable with respect to said members; supporting ledges at the bottom ends of said outer members; and a hollow locking head at the lower end of said element enclosing said ledges, said head having inwardly projecting, interior lugs adapted to rest on said ledges to support said element against removal in downward direction.

4. In a locking pin of the character described, the combination with a pair of elongated outer members having retaining flanges at the top and bottom ends; of an elongated cylindrical filler element between said outer members; diametrically opposed, supporting ledges on said outer members at the bottom ends thereof, said ledges having upwardly opening locking seats; and a hollow, upwardly opening, cup-shaped head at the lower end of said filler element surrounding and enclosing the lower end portions of said outer members and said supporting ledges, said cup-shaped head having diametrically opposite, interior lugs supported on said ledges within said seats to support said element against downward displacement and hold the same against rotation.

5. In a locking pin of the character described, the combination with a pair of elongated outer members having retaining flanges at the top and bottom ends; of an elongated central cylindrical filler element between said members for holding the same spread apart; depending extensions on said outer members embracing said element on opposite sides; and an upwardly opening, hollow locking head on the lower end of said element, said head enclosing said depending extensions and having interior shoulders in shouldered engagement with said extensions to support said element against downward displacement.

6. In a locking pin of the character described, the combination with a pair of outer members headed at the top and bottom ends; of a rotatable cylindrical filler element between said outer members for holding the same separated; depending extensions at the lower ends of said outer members; diametrically opposite, outwardly projecting, supporting wings on said depending extensions of said outer members, said wings being provided with upwardly opening seats; a cup-shaped, hollow head at the lower end of said element, said head having a cylindrical side wall surrounding said depending extensions and enclosing said supporting wings; and diametrically opposite, interior lugs on said hollow head projecting inwardly from the side wall thereof at the upper end of the latter, said lugs resting on said ledges within the seats thereof to support said element against downward displacement and lock the same against rotation.

GEORGE E. DATH.